US009073395B2

(12) United States Patent
Delgado et al.

(10) Patent No.: US 9,073,395 B2
(45) Date of Patent: Jul. 7, 2015

(54) AIR MAINTENANCE TIRE AND PUMPING TUBE ASSEMBLY AND METHOD (71) Applicant: The Goodyear Tire & Rubber Company, Akron, OH (US)

(72) Inventors: Andres Ignacio Delgado, Medina, OH (US); Christopher David Dyrlund, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/486,121

(22) Filed: Sep. 15, 2014

(65) Prior Publication Data

US 2015/0000136 A1    Jan. 1, 2015

Related U.S. Application Data (62) Division of application No. 13/252,242, filed on Oct. 4, 2011, now Pat. No. 8,851,132.

(51) Int. Cl.
*B60C 19/00* (2006.01)
*B60C 23/12* (2006.01)

(52) U.S. Cl.
CPC ......... *B60C 23/12* (2013.01); *Y10T 29/49538* (2015.01); *Y10T 152/10495* (2015.01); *Y10T 29/49826* (2015.01)

(58) Field of Classification Search
CPC ........ B60C 23/12; B60C 29/04; B60C 13/02; B60C 19/00; B21D 53/26
USPC .......... 152/415, 418, 419, 423, 424, 425, 426
See application file for complete search history.

(56) References Cited

U.S. PATENT DOCUMENTS

| 1,050,886 | A | * | 1/1913 | Wetherell | 152/426 |
|---|---|---|---|---|---|
| 3,304,981 | A | * | 2/1967 | Sheppard | 152/426 |
| 3,833,041 | A | * | 9/1974 | Glad et al. | 152/509 |
| 3,867,973 | A | | 2/1975 | Cozzolino et al. | 152/153 |
| 7,117,731 | B2 | * | 10/2006 | Hrabal | 73/146 |
| 7,225,845 | B2 | * | 6/2007 | Ellmann | 152/426 |
| 8,042,586 | B2 | * | 10/2011 | Losey et al. | 152/426 |
| 8,322,036 | B2 | * | 12/2012 | Delgado et al. | 29/894.37 |
| 2004/0112495 | A1 | | 6/2004 | Weise | 152/331.1 |
| 2009/0294006 | A1 | | 12/2009 | Hrabal | 152/426 |

FOREIGN PATENT DOCUMENTS

| EP | 2338703 | 9/2011 | B60C 23/00 |
|---|---|---|---|
| WO | 2007/134556 | 11/2007 | B60C 15/024 |

* cited by examiner

*Primary Examiner* — S. Joseph Morano
*Assistant Examiner* — Jean Charleston
(74) *Attorney, Agent, or Firm* — Richard B. O'Planick (57) ABSTRACT A tire has an elongate profiled sidewall groove extending into a first tire sidewall from an outward first sidewall surface. An elongate air tube is positioned within the elongate sidewall groove in contact with the groove sidewalls, the air tube having an external surface configuration corresponding with and seating within the internal sidewall configuration defining the sidewall groove. The air tube when subject to outward originating impinging force collapses from an expanded unstressed configuration into a collapsed configuration to allow the tube to insert through the groove entry opening and expand outwardly once within the sidewall groove to its unstressed configuration. The configuration of the groove sidewalls capture the air tube within the groove in its expanded unstressed configuration to prevent separation of the tube from the tire during use.

4 Claims, 13 Drawing Sheets

AIR MAINTENANCE TIRE AND PUMPING TUBE ASSEMBLY AND METHOD

This application claims the benefit of currently pending U.S. application Ser. No. 13/252,242, filed Oct. 3, 2011.

FIELD OF THE INVENTION

The invention relates generally to air maintenance tires and, more specifically, to an air maintenance tire and pumping tube assembly therefore and method of assembly.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will re-inflate the tire in order to compensate for any reduction in tire pressure over time without the need for driver intervention.

SUMMARY OF THE INVENTION

In one aspect of the invention, a tire is provided having an elongate sidewall groove extending into a first tire sidewall from an outward first sidewall surface; the sidewall groove having an outer groove entry opening, a groove entry chamber axially inward from the groove entry opening defined by divergent entry chamber sidewalls, and a groove primary chamber axially inward from the groove entry chamber. The groove entry chamber sidewalls and the groove primary chamber sidewalls intersect to form at the intersection a detent channel. An elongate air tube is positioned within the elongate sidewall groove in contact with the groove primary chamber sidewalls. The air tube has an external surface configuration corresponding with the sidewall configuration defining the elongate sidewall groove.

In another aspect, the air tube body has an external protrusion configured and dimensioned to register and seat within the detent channel of the sidewall groove.

The air tube, in yet another aspect of the invention, is formed of resilient material operative when subject to outward originating impinging force on the air tube to collapse from an expanded unstressed configuration into a collapsed configuration to allow the tube to insert through the groove entry opening and expand outwardly once within the sidewall groove to its unstressed configuration.

According to another aspect, a method for inserting a so-configured air tube into a sidewall groove of a tire is provided including collapsing the air tube from an expanded unstressed configuration into a collapsed configuration to allow the tube to insert through the groove entry opening and expanding the tube outwardly once within the sidewall groove to its unstressed configuration.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
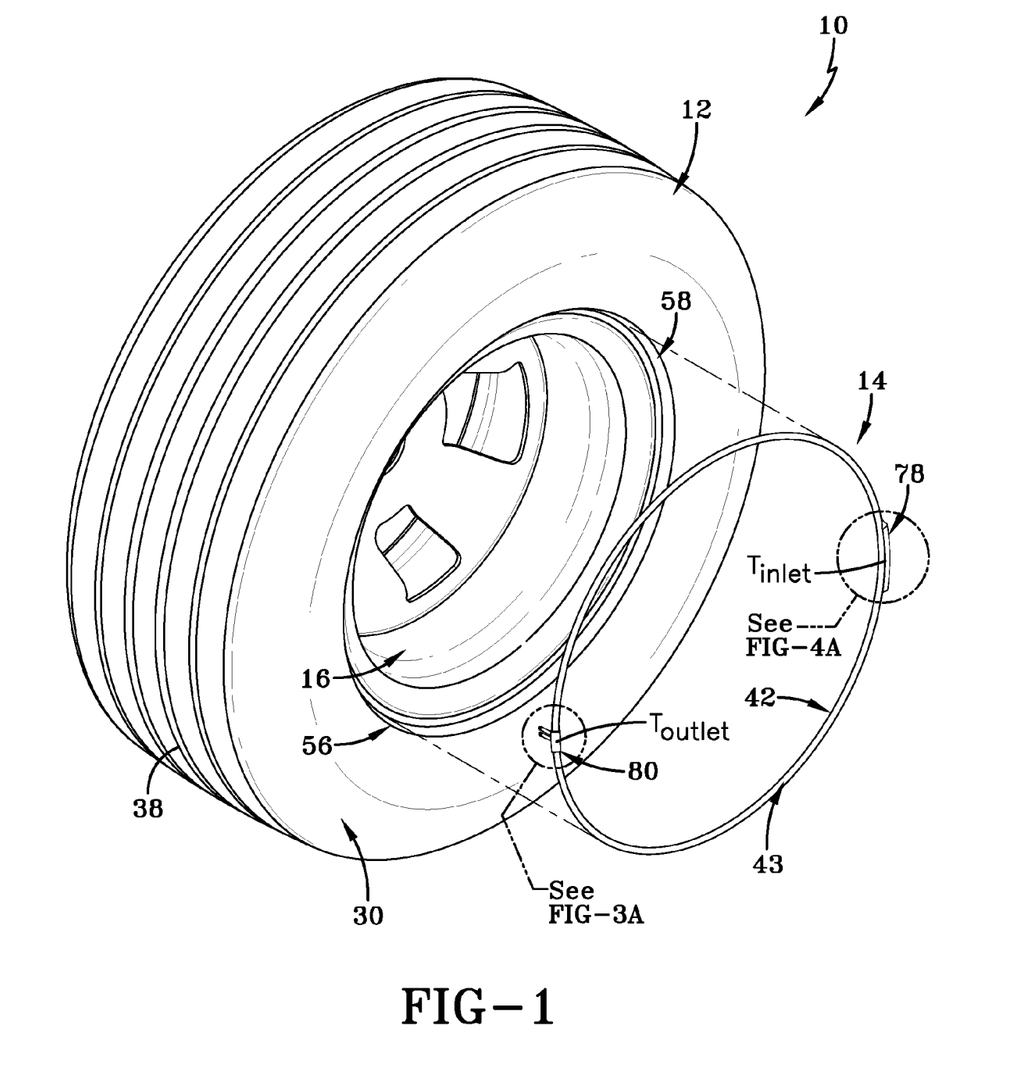
FIG. 1 is an exploded isometric view of a tire, rim, and peristaltic tube assembly.
Figure 2:
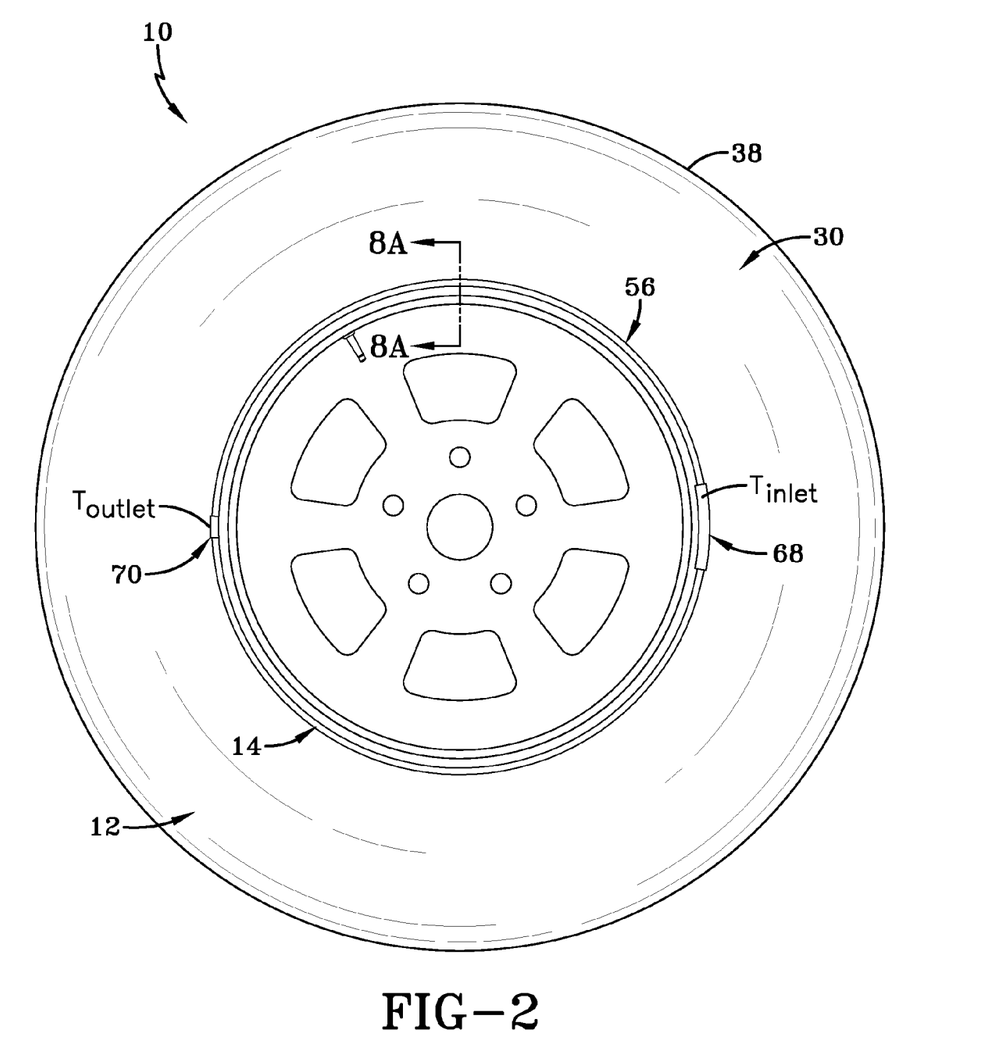
FIG. 2 is a side view of the tire with the peristaltic tube assembly within a tire sidewall.
Figure 6A:
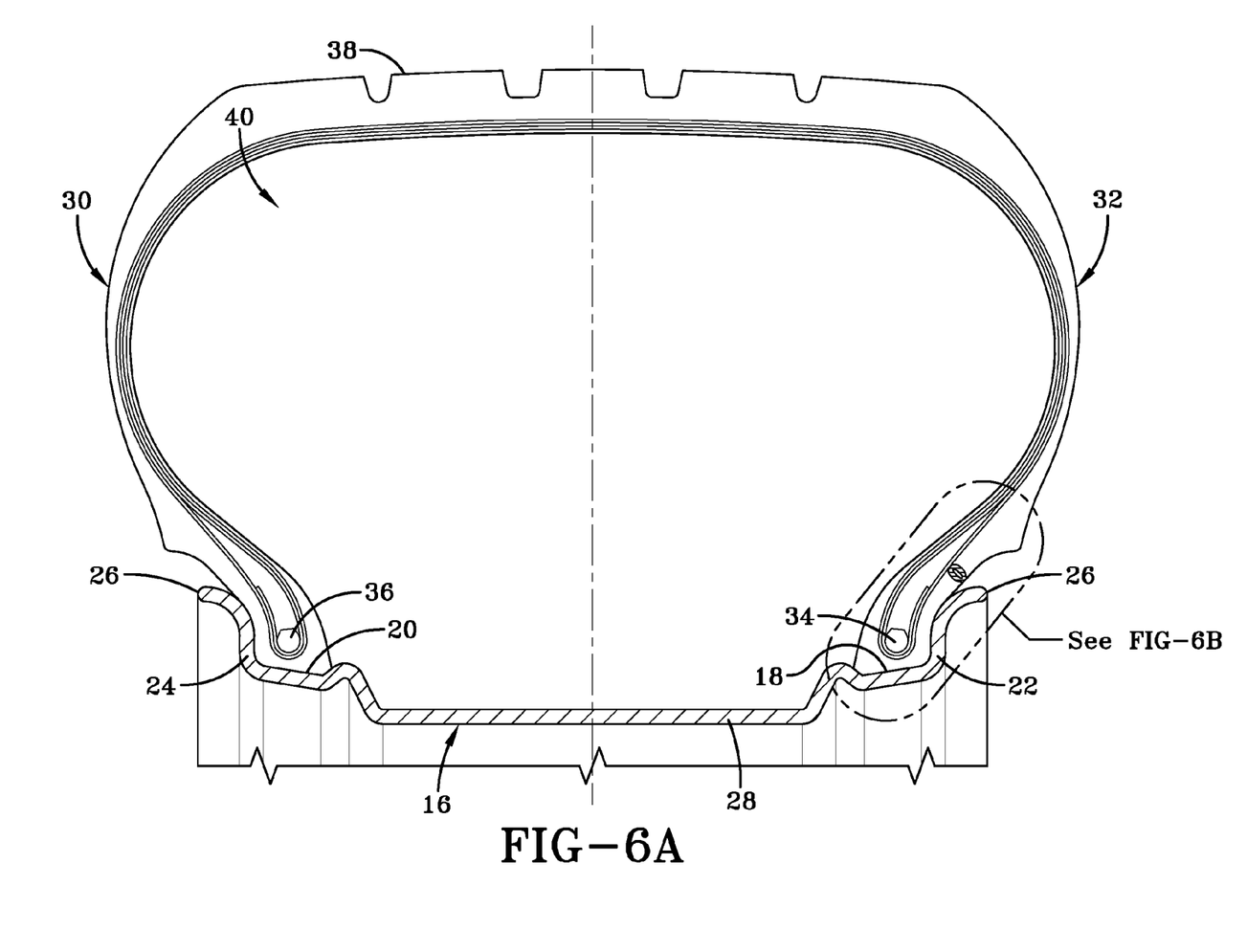
FIG. 6A is a transverse section view through the tire and peristaltic tube assembly.
Figure 6B:
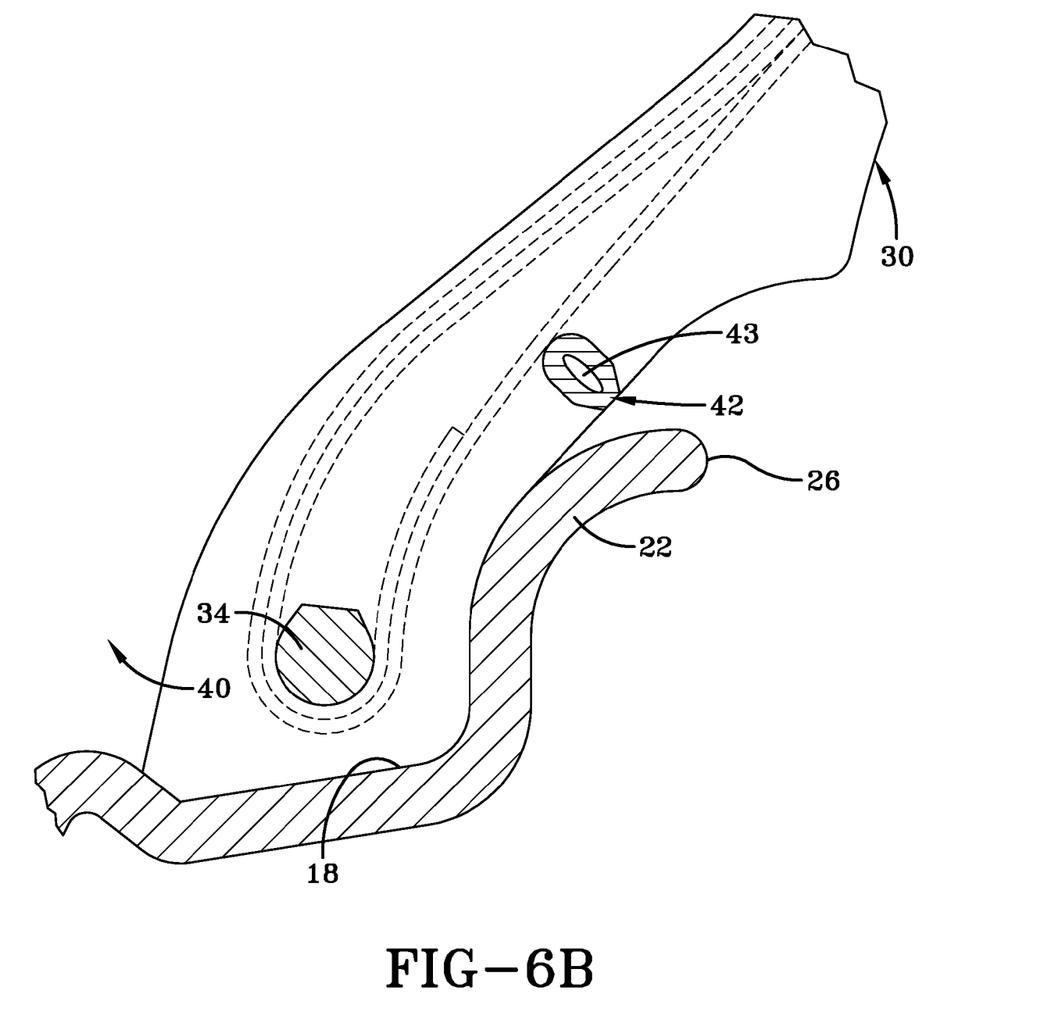
FIG. 6B is an enlarged section view of the portion of the tire bead region, rim, and a non-collapsed peristaltic tube segment as identified in FIG. 6A.
Figure 7A:
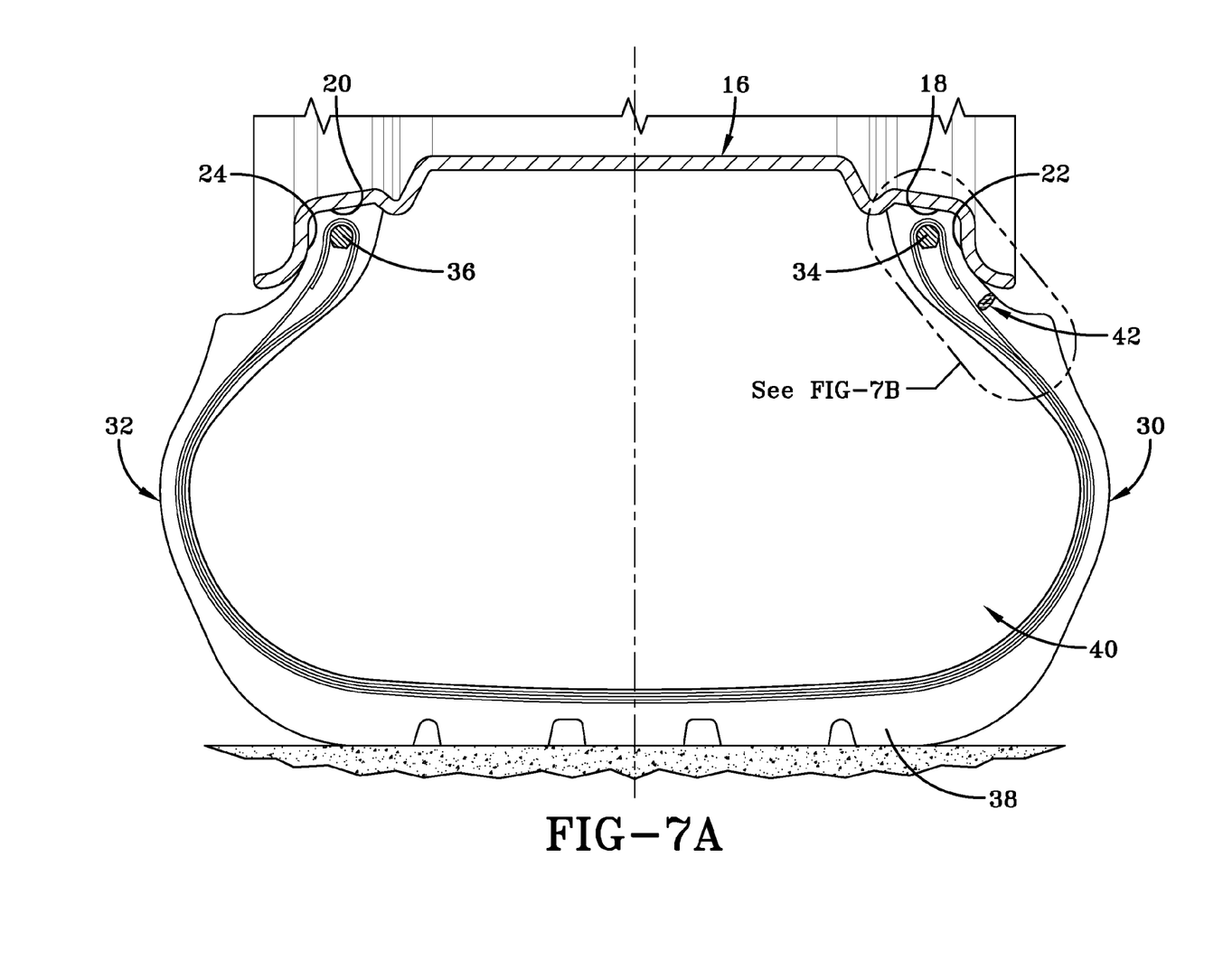
FIG. 7A is a transverse section view through the tire and peristaltic tube assembly with the tube in the collapsed configuration.
Figure 7B:
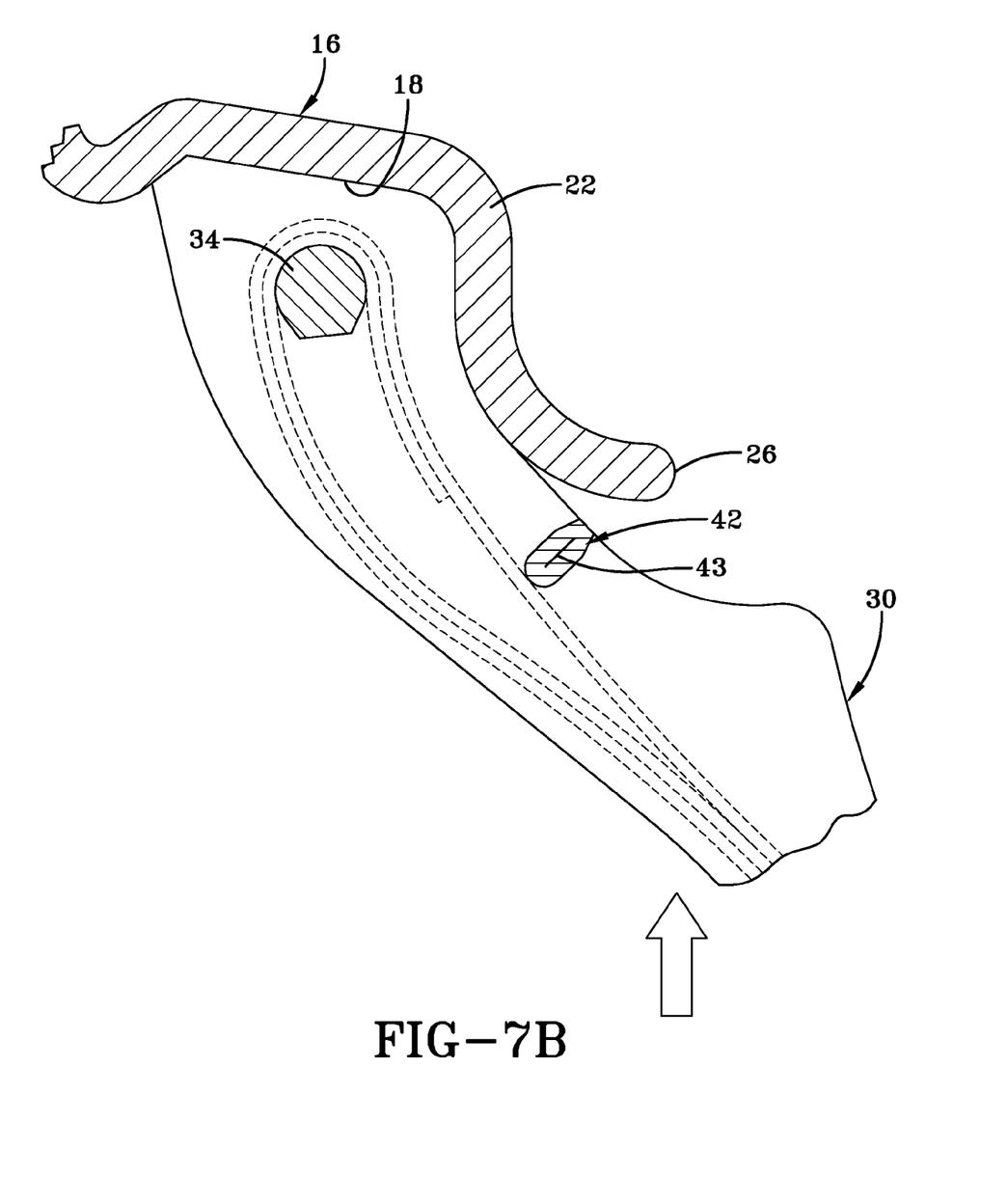
FIG. 7B is an enlarged section view of a portion of the tire bead region, rim, and collapsed tube segment identified in FIG. 7A.

Referring to FIGS. 1, 2, and 6A, a tire assembly 10 includes a tire 12, a peristaltic pump assembly 14, and a tire rim 16. The tire mounts in conventional fashion to a pair of rim mounting surfaces 18, 20 adjacent outer rim flanges 22, 24. The rim flanges 22, 24, each have a radially outward facing flange end 26. A rim body 28 supports the tire assembly as shown. The tire is of conventional construction, having a pair of sidewalls 30, 32 extending from opposite bead areas 34, 36 to a crown or tire tread region 38. The tire and rim enclose a tire cavity 40.

As seen from FIGS. 1, 2, 5A, 5B, 6A, 6B and 8D the peristaltic pump assembly 14 includes an annular air tube 42 that encloses an annular passageway 43. The tube 42 is formed of a resilient, flexible material such as plastic or rubber compounds that are capable of withstanding repeated deformation cycles wherein the tube is deformed into a flattened condition subject to external force and, upon removal of such force, returns to an original condition. The tube passageway 43 is generally elliptical in section and is of a diameter sufficient to operatively pass a volume of air sufficient for the purposes described herein and allowing a positioning of the tube in an operable location within the tire assembly as will be described. In the configuration shown, the tube 42 is elongate and circular. The tube 42 is asymmetric about an elongate major axis and is constructed having an outward flat end surface 44, a tapered protruding outward portion 46, and a main body portion 48. The protruding portion 46 of the tube 42 is defined by beveled surfaces 52, 54 that diverge from the flat tube surface 44 to an arcuate outward surface 56 of the main body portion 48 of the tube 42. At the intersection of the beveled surfaces 52, 54 and outer surface 56 of the main body portion 48 a pair of shoulders 57, 59, respectively, are formed which extend the length of tube 42 on opposite respective sides of protruding portion 46.

An elongate groove 58 is formed to extend into an axially outward surface of a sidewall such as sidewall 30, preferably in the geometric form of an annular ring. The other sidewall may be grooved or both sidewalls if so desired. The groove 58 has an internal sectional profile complementary with the external geometry of the tube 42, and includes an entry opening 60 exposed to the outer surface 61 of the sidewall 30. The groove 58 is formed to provide an entry chamber 62 adjacent to and axially inward of the opening 60 and a primary chamber 64 axially inward from and adjacent to the entry chamber 62. The entry chamber 62 is defined by beveled sidewalls 66, 68 diverging axially inward from the opening 60 and the primary chamber is defined by primary chamber sidewalls 70. At the intersection of the beveled sidewalls 66, 68 and the inward sidewalls 70 of the primary chamber a pair of shoulders detent channels 72, 74, respectively, are formed which extend the length of groove 58 on opposite respective sides of the groove.

Figure 8A:
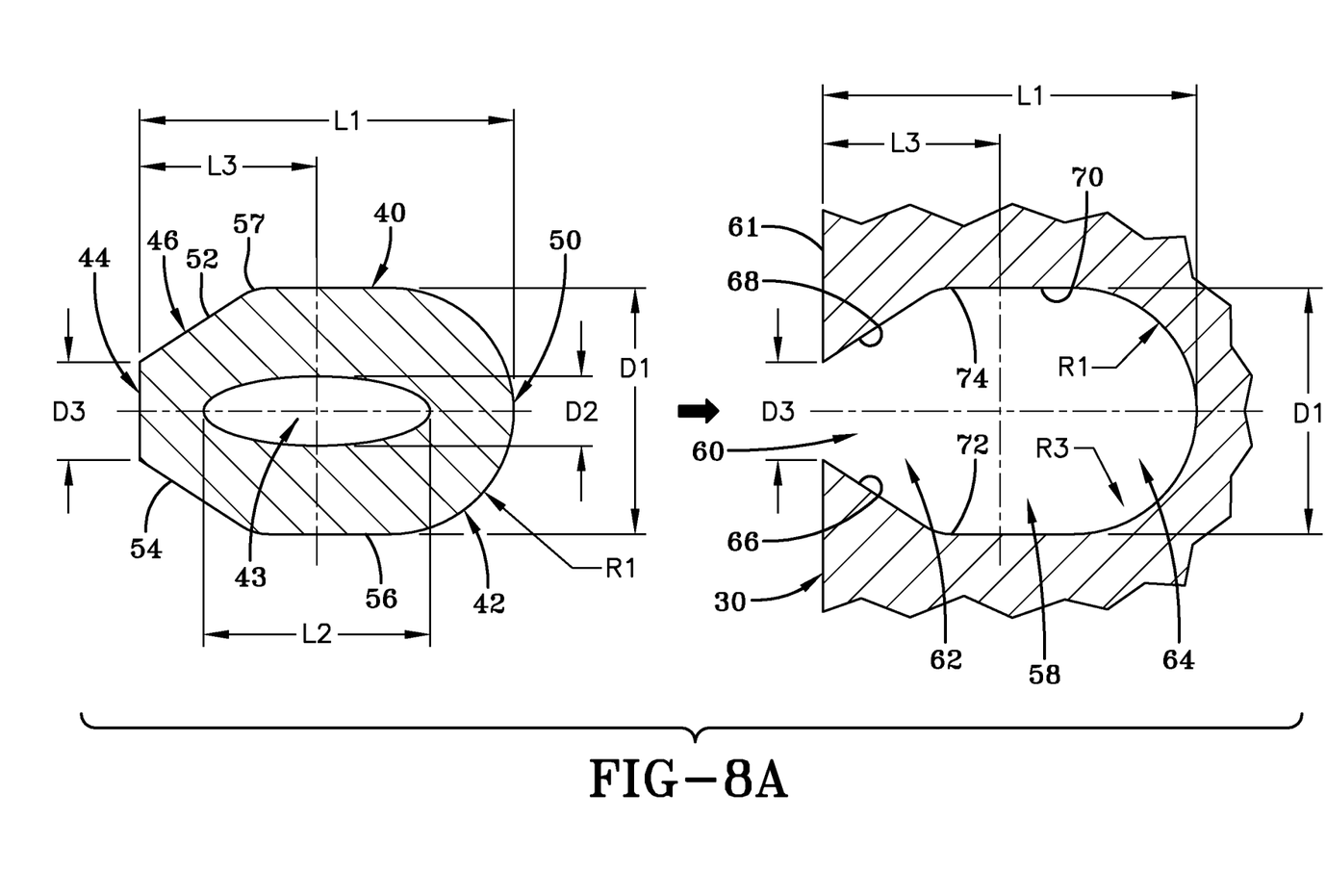
FIG. 8A is an enlarged sectional exploded view of the tube and tube-receiving groove within the tire sidewall.

As referenced in FIG. 8A, the tube 42 has a transverse sectional width length L1 within a preferred range of 3.65 to 3.8 mm; a preferred height of D1 within a range of 2.2 to 3.8 mm; a trailing end preferred width of D3 within a range of 0.8 to 1 mm. The internal air passageway 43 is generally elliptical having a length L2 along a major axis within a preferred range of 2.2 to 2.3 mm, and a width D2 along a transverse axis within a preferred range of 0.5 to 0.9 mm. The tube 42 has an axial distance L3 between the end surface 44 and the center of the passageway 43 lying within a preferred range of 1.8 to 2 mm.

The groove 58 is of complementary internal geometry to accommodate close receipt of the tube 42. As shown in FIG. 8A, the groove 58 is dimensionally compatible for receipt of the tube 42, and incorporates dimensions D1, D3, L1, L3 within the preferred ranges previously set forth with respect to the tube 42. The primary chamber 64 is radiussed by a radius R1 lying within a preferred range of 1.1 to 1.9 mm. The beveled surfaces 66, 68 and complementary divergent surfaces 52, 54 of the tube 42 are sloped at generally an acute angle of approximately 45 degrees.

Figure 8B:
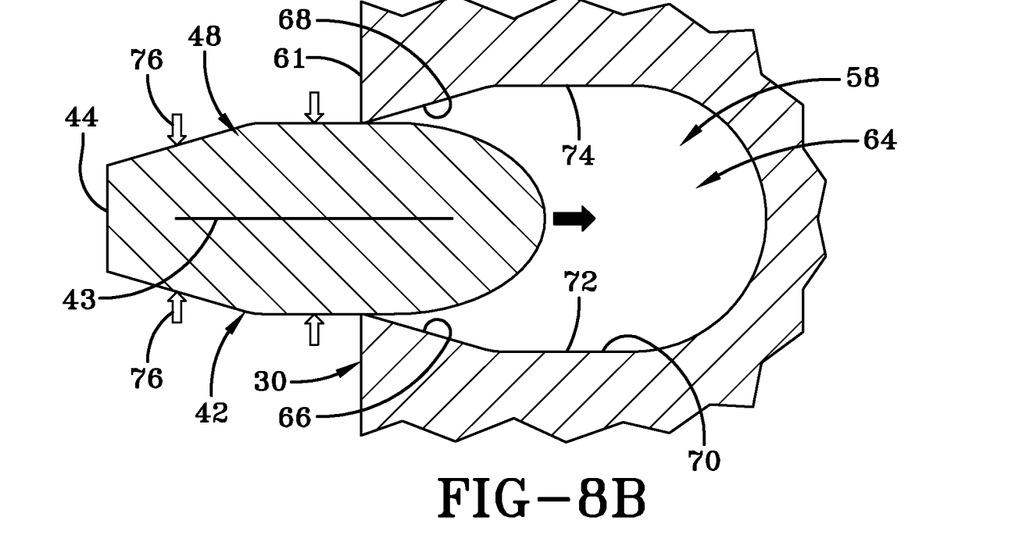
FIGS. 8B and 8C are subsequent sequential sectional views to FIG. 8A showing insertion of the tube into the sidewall groove.
Figure 8C:
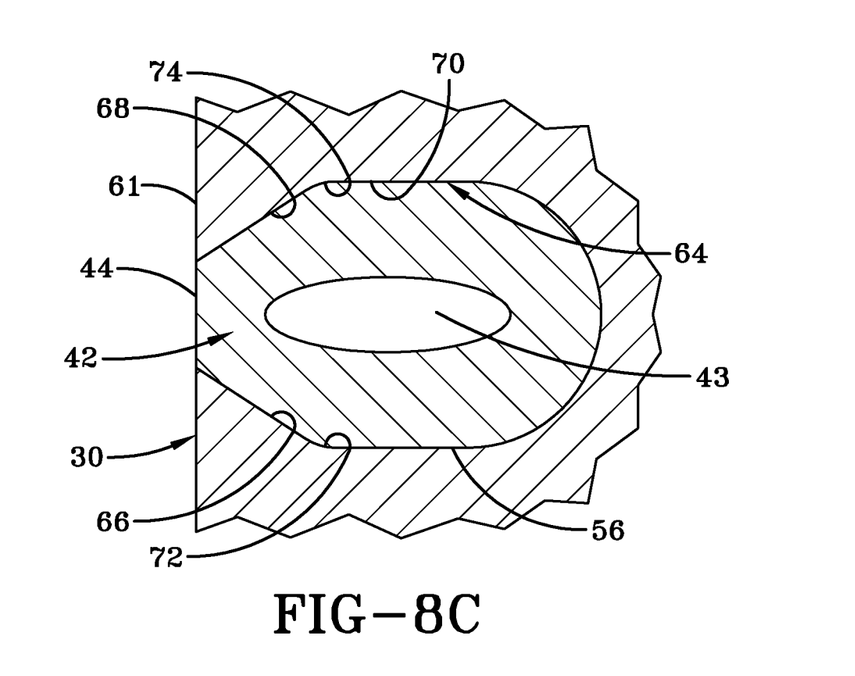
Figure 8D:
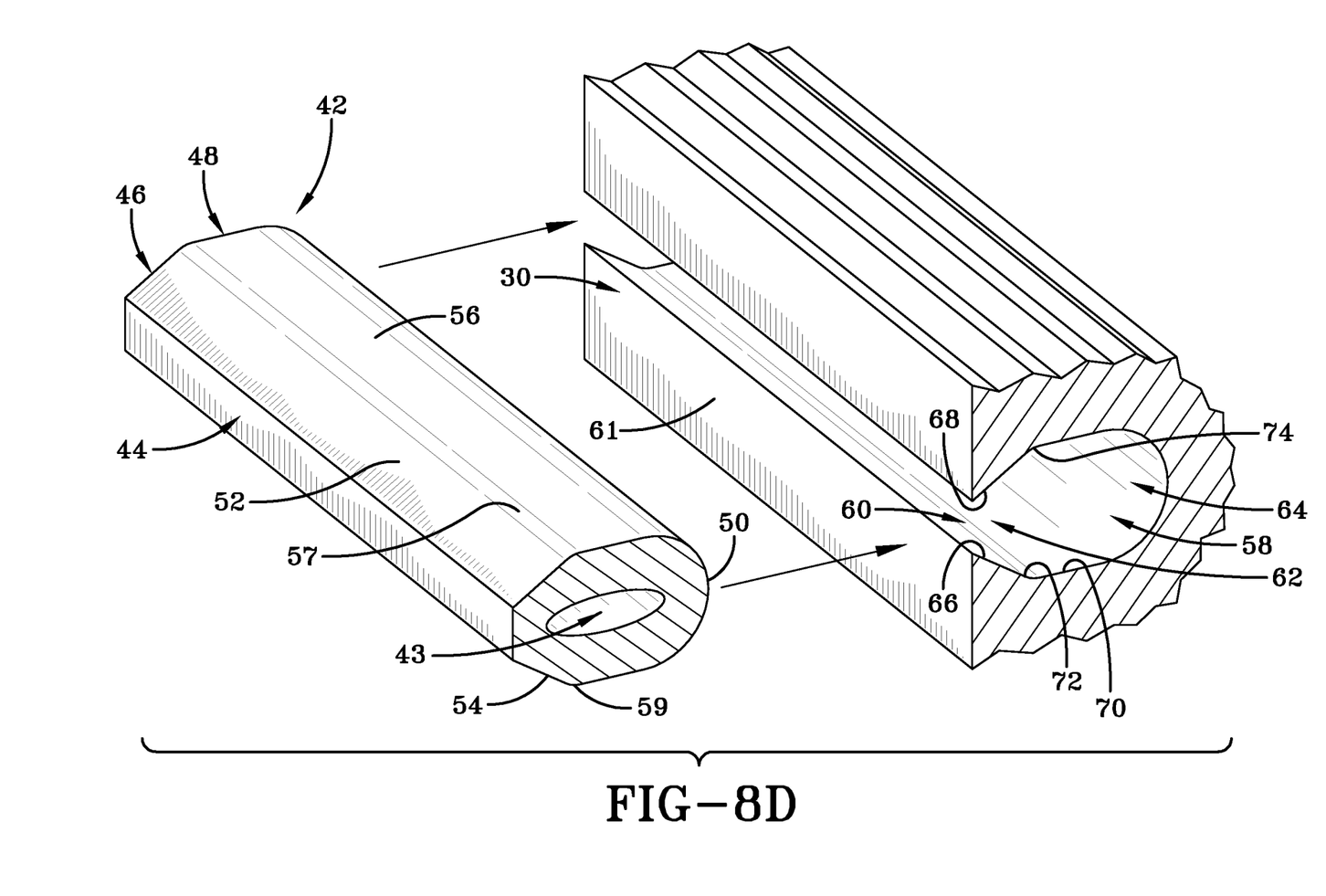
FIG. 8D is a fragmented exploded view of the tube and sidewall groove corresponding to FIG. 8A.

As best seen from FIGS. 8A-D, insertion of the tube 42 into the groove 58 is initiated by axially aligning the tube 42 with the entry opening 60 of the groove 58; compressing the tube 42 in the direction of arrows 76 so as to reduce the groove height, whereby collapsing the groove air passageway 43; inserting the tube 42 laterally through the groove opening 60 and into the space defined by entry chamber 62 and primary chamber 64; removing the compression force at arrows 76, thereby freeing the tube 42 to expand outward into its nominal unstressed configuration of FIGS. 8A, 8C, and 8D and occupy the groove 58. The tube 42 is thus located within the groove 58 with external surfaces of the groove disposed adjacent to corresponding complementary sidewalls defining the groove 58. In the expanded, unstressed condition of the tube, the shoulders 57, 59 of the tube 42 register within the detent channels 72, 74 formed at the intersection of groove sidewalls 66, 68 and 70. So registered, the divergent sides 52, 54 of the tube abut the entry chamber divergent sidewalls 66, 68, respectively, and thereby retain the tube 42 within the groove 58.

Figure 3A:
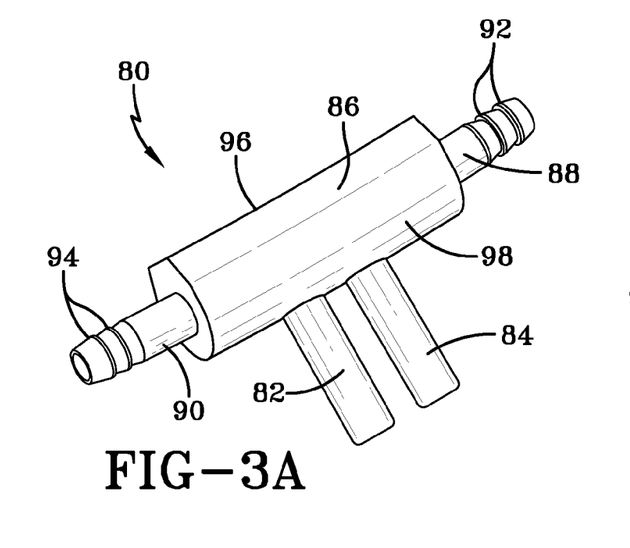
FIG. 3A is an isometric view of an outlet device component showing of the tube assembly.
Figure 3B:
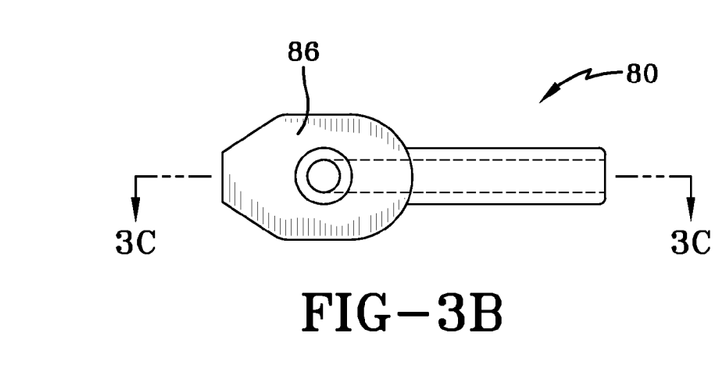
FIG. 3B is a plan view of the outlet device.
Figure 3C:
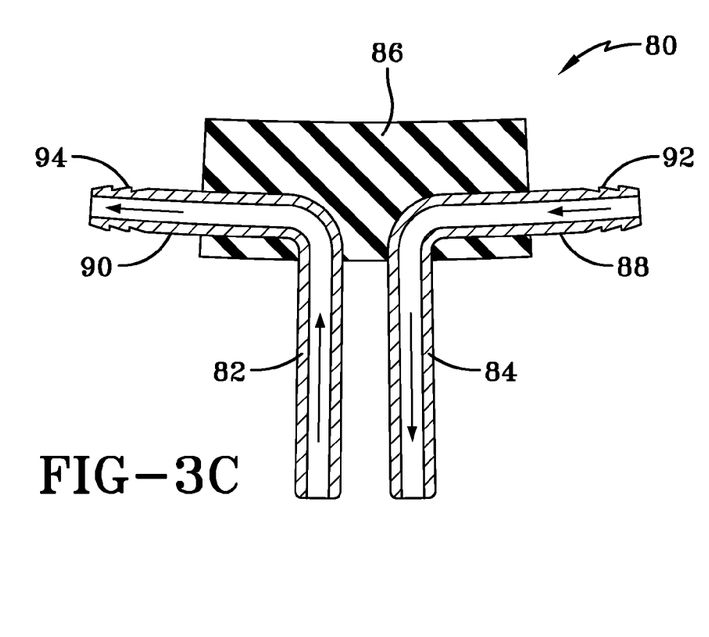
FIG. 3C is a section view through the outlet device taken along the line 3C-3C of FIG. 3B.
Figure 4A:
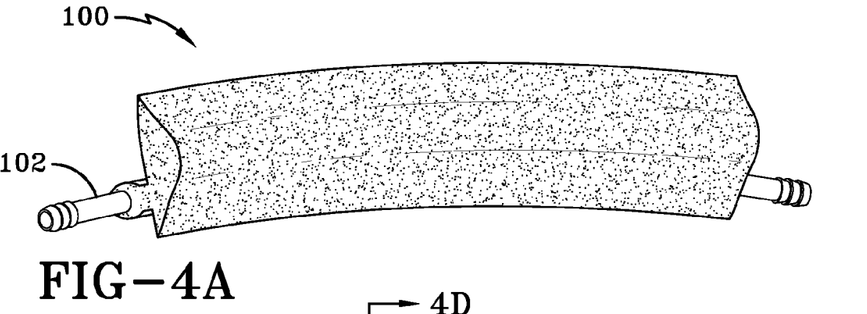
FIG. 4A is an isometric view of an inlet device component of the tube assembly.
Figure 4B:
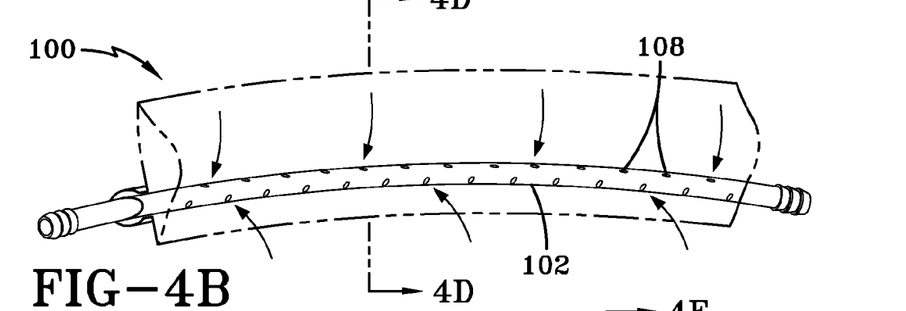
FIG. 4B is an isometric view of the inlet device with the filter sleeve in phantom.
Figure 4C:
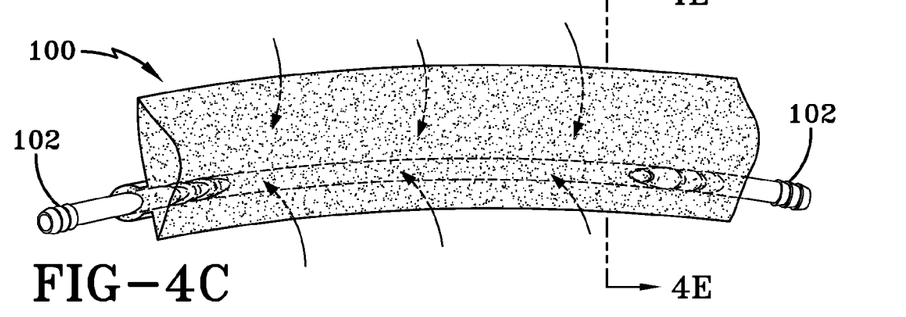
FIG. 4C is an isometric view of the inlet device component showing air intake schematically and the tube of the device in phantom.
Figure 4D:
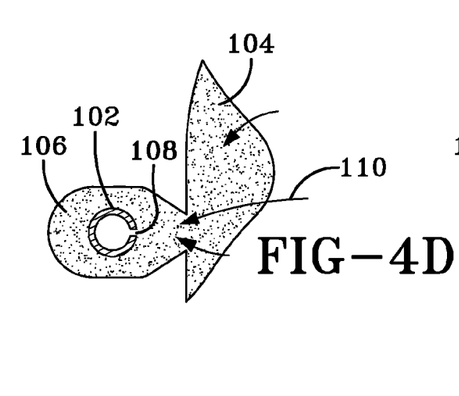
FIG. 4D is a sectional view through the inlet device taken along the line 4D-4D of FIG. 4B.
Figure 4E:
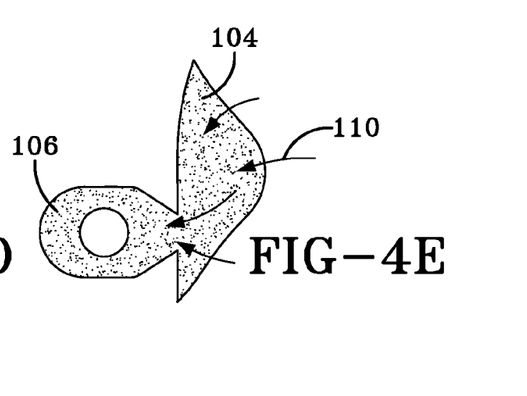
FIG. 4E is a section view through the inlet device taken along the line 4E-4E of FIG. 4C.

With reference to FIGS. 1, 2, 3A through 3C and 4A through E, the peristaltic pump assembly 14 further includes an inlet device 78 and an outlet device 80 spaced apart approximately 180 degrees at respective locations along the circumferential air tube 42. The outlet device 80, as shown in FIGS. 3A through 3C, has a T-shaped configuration in which conduits 82, 84 direct air to and from the tire cavity 40. An outlet device housing 86 contains conduit arm extensions 88, 90 that integrally extend at right angles from respective conduits 82, 84. Each of the conduit arms 88, 90 have external coupling ribs or barbs 92, 94 for retaining the conduits within disconnected ends of the air tube 42 in the assembled condition. The housing 86 is formed having an external geometry that complements the groove 58 and includes a flat side 96 along a generally oblong body 98. So configured, the housing 86 is capable of close receipt into the groove 58 at its intended location.

The inlet device 78 as seen in FIGS. 1, 2, 4A through 4E includes an elongate outward porous filtering sleeve 100 encasing an internal intake tube 102. The outward sleeve 100 has an external geometry including a tubular inward air passage body 102. The sleeve 100 is configured to provide a bored tubular inward body 106 attached to an outward lobe body 104. The intake tube 102 has multiple air intake openings 108 therein which communicate with an axial air passageway extending through the tube 102. The inward body 106 is geometrically profiled to fit within the groove 58 with the lobe body 104 abutting against an outward surface of the tire sidewall. Air intake indicated by arrows 110 enters through the porous filtering sleeve 100 and the apertures 108 into the intake tube 102. Ends of the intake tube 102 are attached to the air tube 42 residing within the groove 58 and the tube 102 directs intake air into the tube 42 for pumping into the tire cavity.

As will be appreciated from FIGS. 1, 2, 6A, 6B, 7A and 7B, the pump assembly 14 comprises the air tube 42 and inlet and outlet devices 78, 80. Devices 78, 80 are affixed in-line to the air tube 42 at respective locations 180 degrees apart, is inserted into the groove 58. The groove 58 is located at a lower sidewall region of the tire that, when the tire 12 is mounted to the rim 16, positions the air tube 42 above the rim flange ends 26. FIGS. 8B and 8C show the air tube 42 diametrically squeezed and collapsed to accommodate insertion into the groove 58. Upon full insertion, as shown in FIG. 8C, the air tube 42 fills the void represented by the groove 58. Once fully inserted, the air passageway 43 of the tube 42 elastically restores into an open condition to allow the flow of air along the tube during operation of the pump.

With continued reference to Referring to FIGS. 1, 2, 5A, 5B, 6A, 6B, 7A, 7B, the inlet device 78 and the outlet device 80 are positioned within the circumference of the circular air tube 42 generally 180 degrees apart. The tire 12 with the tube 42 positioned within groove 58 rotates in a direction of rotation 112, causing a footprint 114 to be formed against the ground surface 116. A compressive force 118 is directed into the tire from the footprint 114 and acts to flatten a segment 120 of the air tube passageway 43 opposite the footprint 114 as shown at numeral 120. Flattening of the segment 120 of the passageway 43 forces air from the segment along tube passageway 43 in the direction shown by arrow 122 toward the outlet device 80.

As the tire continues to rotate in direction 112 along the ground surface 116, the tube 42 will be sequentially flattened or squeezed opposite the tire footprint segment by segment in a direction opposite to the direction of tire rotation 112. A sequential flattening of the tube passageway 43 segment by segment will result and cause evacuated air from the flattened segments to be pumped in the direction 122 within tube passageway 43 to the outlet device 80 and from the outlet device 80 to the tire cavity as shown at 124. A valve system to regulate the flow of air to the cavity when the air pressure within the cavity falls to a prescribed level is shown and described in pending U.S. patent applicant Ser. No. 12/775, 552, filed May 7, 2010, and incorporated herein by reference.

Figure 5A:
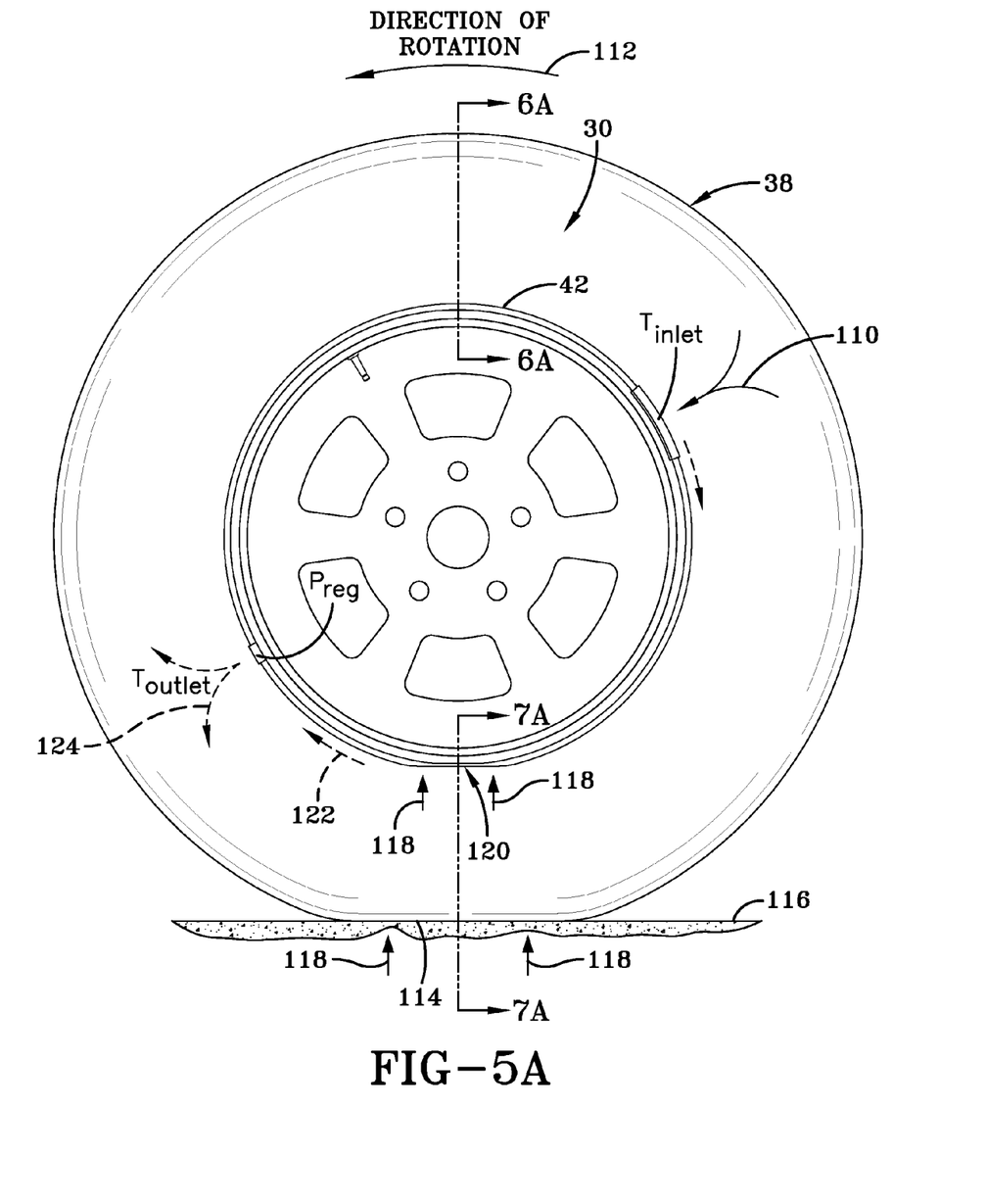
FIG. 5A is a side elevation view of the tire and peristaltic tube assembly shown schematically rotating against a road surface.
Figure 5B:
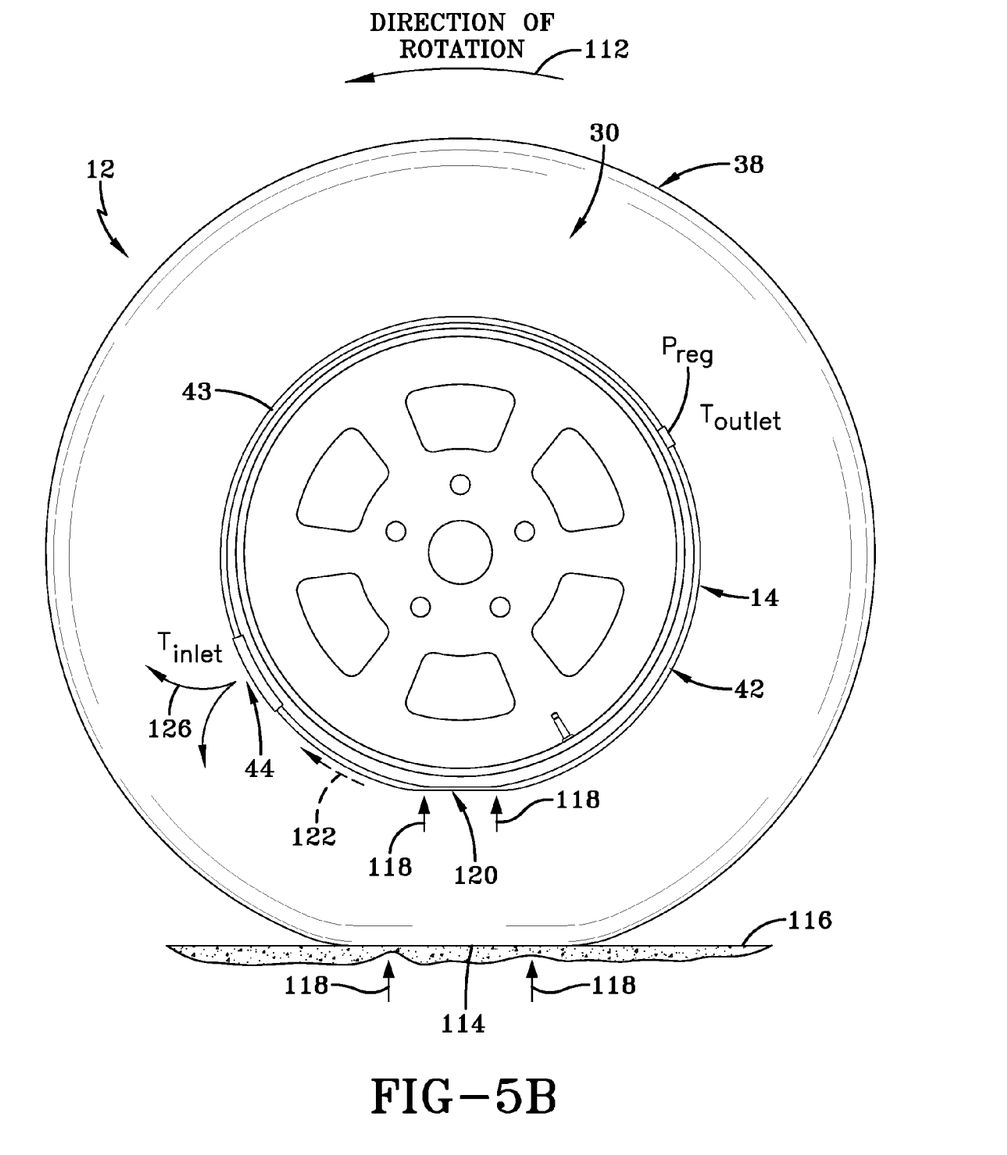
FIG. 5B is a side elevation view of the tire and peristaltic tube assembly shown sequentially subsequent to the position of FIG. 5A.

With the tire rotating in direction 112, flattened tube segments are sequentially refilled by air flowing into the inlet device 78 in the direction 110 as shown by FIG. 5A. The inflow of air into the inlet device 78 and then into the tube passageway 43 continues until the outlet device 80, rotating counterclockwise as shown with the tire rotation, passes the tire footprint 114. FIG. 5B shows the orientation of the peristaltic pump assembly 14 in such a position. In the position shown, the tube 42 continues to be sequentially flattened segment by segment opposite the tire footprint by compressive force 118. Air is pumped in the clockwise direction 122 to the inlet device 78 where it is evacuated or exhausted outside of the tire. Passage of exhaust air as shown at 126 from the inlet device 78 is through the filter sleeve 100 which is formed of a cellular or porous material or composite. Flow of air through the sleeve 100 causes the sleeve 100 to be thus cleansed of debris or particulates. In the exhaust or reverse flow of air direction 126, the sleeve 100 is cleansed of trapped accumulated debris or particles within the porous medium. With the evacuation of pumped air out of the inlet device 78, the outlet device is in the closed position and air does not flow to the tire cavity. When the tire rotates further in counterclockwise direction 112 until the inlet device 78 passes the tire footprint 114 (as shown in FIG. 5A), the airflow resumes to the outlet device 80 and causes the pumped air to flow out and into the tire cavity 40. Air pressure within the tire cavity is thus maintained at a desired level.

The above-described cycle is then repeated for each tire revolution, half of each rotation resulting in pumped air going to the tire cavity and half of the rotation the pumped air is directed back out the inlet device filter sleeve 100 to self-clean the filter. It will be appreciated that while the direction of rotation 112 of the tire 12 is as shown in FIGS. 5A and 5B to be counterclockwise, the subject tire assembly and its peristaltic pump assembly 14 will function in like manner in a (clockwise) reverse direction of rotation as well. The peristaltic pump is accordingly bi-directional and equally functional with the tire assembly moving in a forward or a reverse direction of rotation.

A preferred location for the air tube assembly 14 is as shown in FIGS. 5A, 5B, 6A, 6B, 7A and 7B. The tube 42 is located within the groove 58 in a lower region of the sidewall 30 of the tire 12. So located, the passageway 43 of the tube 42 is closed by compression strain bending the sidewall groove 58 within a rolling tire footprint as explained above. The location of the tube 42 in the sidewall 30 affords the user freedom of placement and avoids contact between the tube 42 and the rim 16. The higher placement of the tube 42 in the sidewall groove 58 uses the high deformation characteristics of this region of the sidewall as it passes through the tire footprint to close the tube.

From the forgoing, it will be appreciated that the subject invention provides a bi-directionally peristaltic pump for air maintenance of a tire. The circular air tube 42 flattens segment by segment and closes in the tire footprint 114. The air inlet device 78 may include an outer filter sleeve 100 formed of porous cellular material and thereby render device 78 as self-cleaning. The outlet device 80 employs a valve unit (see co-pending U.S. patent application Ser. No. 12/775,552, filed May 7, 2010, incorporated herein by reference). The peristaltic pump assembly 14 pumps air under rotation of the tire in either direction, one half of a revolution pumping air to the tire cavity 40 and the other half of a revolution pumping air back out of the inlet device 68. The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

The tire air maintenance system further incorporates a specified geometric shape to the tube 42 which locks into the groove 48 and prevents inadvertent dislodgement of the tube during tire operation. The tube 42 flattens into a compressed configuration and is inserted laterally into the groove 58. Upon removal of the compression forces, the tube 42 resumes its original shape and fills the void represented by groove 58. The tapered sides of the sidewalls defining the groove 58 in complement with the like-tapered external sides of the groove prevent any escape of the tube 42 through the smaller entryway of the groove 58.

It will thus be appreciated that, in the subject invention, an elongate sidewall groove 58, preferably in a circular configuration, extends into one or both of the tire sidewalls from an outward sidewall surface. Each sidewall groove 58 has an outer groove entry opening, a groove entry chamber axially inward from the groove entry opening defined by divergent entry chamber sidewalls, and a groove primary chamber axially inward from the groove entry chamber. The groove entry chamber sidewalls and the groove primary chamber sidewalls intersect to form at the intersection a detent channel. The elongate air tube 42, likewise in a preferably circular configuration, is positioned within the elongate sidewall groove in contact or in close proximity with the groove primary chamber sidewalls. The air tube has an external surface configuration corresponding with the sidewall configuration defining the elongate sidewall groove.

The air tube body 42 has an external protrusion 57, 59 configured and dimensioned to register and seat within the detent channels 72, 74 of the sidewall groove, to hold the air tube 42 in place within the groove. The air tube 42, being formed of resilient material, is capable when subject to outward originating impinging force on the air tube of collapsing from an expanded unstressed configuration into a collapsed configuration to allow the tube to insert through the groove entry opening and expand outwardly once within the sidewall groove to its unstressed configuration. The method for inserting the configured air tube 42 into the sidewall groove 58 includes collapsing the air tube from an expanded unstressed configuration into a collapsed configuration to allow the tube to be inserted through the groove entry opening and, once inserted, expanded outwardly to its unstressed configuration.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of assembling an elongate air tube within a tire, the tire having a tire cavity, a first and a second sidewall extending to a tire tread region; comprising:
   deploying an elongate sidewall groove into the first tire sidewall from an outward first sidewall surface; the sidewall groove having an outer groove entry opening, a groove entry chamber axially inward from the groove entry opening defined by divergent entry chamber sidewalls, and a groove primary chamber axially inward from the groove entry chamber defined by primary chamber sidewalls, the groove entry chamber sidewalls and the groove primary chamber sidewalls intersecting;
   advancing an elongate air tube laterally relative to an air tube center axis and toward the outer groove entry opening, the air tube having an internal air passageway and the air tube having an air tube body formed of resilient material operative when subject to outward originating impinging forces on the air tube body to collapse from an expanded unstressed configuration into a collapsed configuration wherein the air passageway is substantially closed;
   applying an impinging force on the air tube body to collapse the air tube body into the collapsed configuration wherein the air tube body having a reduced diametric dimension;
   inserting the air tube body in the collapsed configuration through the sidewall groove entry opening and into the groove primary chamber; and
   removing the impinging force;
   expanding the air tube body within the groove primary chamber to the expanded configuration within the sidewall groove.

2. The method of claim 1, wherein further comprising:
   forming at the intersection of the groove entry chamber sidewalls and the groove primary chamber sidewalls a detent channel; and
   positioning an air tube body protrusion within the detent channel with the air tube located within the sidewall groove in the expanded configuration.

3. The method of claim 2, further comprising expanding the air tube body within the sidewall groove to substantially occupy a volumetric entirety of the sidewall groove.

4. The method of claim 3, further comprising orienting a longitudinal axis of the air passageway in an axial direction within the sidewall groove.

* * * * *